United States Patent
Salonidis et al.

(10) Patent No.: US 9,374,140 B2
(45) Date of Patent: Jun. 21, 2016

(54) METHOD OF, AND APPARATUS FOR, CONTROLLING A WIRELESS CONNECTION IN A MIMO SYSTEM USING MULTI-SECTOR DIRECTIONAL ANTENNAS

(71) Applicant: THOMSON LICENSING, Issy de Moulineaux (FR)

(72) Inventors: Theodoros Salonidis, Cambridge, MA (US); Tae Hyun Kim, Seoul (KR); Henrik Lundgren, Le Plessis Robinson (FR)

(73) Assignee: Thomson Licensing (FR)

( * ) Notice: Subject to any disclaimer, the term of this patent is extended or adjusted under 35 U.S.C. 154(b) by 0 days.

(21) Appl. No.: 14/384,551

(22) PCT Filed: Mar. 12, 2013

(86) PCT No.: PCT/EP2013/054994
§ 371 (c)(1),
(2) Date: Sep. 11, 2014

(87) PCT Pub. No.: WO2013/135692
PCT Pub. Date: Sep. 19, 2013

(65) Prior Publication Data
US 2015/0049825 A1     Feb. 19, 2015

(30) Foreign Application Priority Data
Mar. 15, 2012   (EP) .................................. 12305307

(51) Int. Cl.
*H04B 7/02*   (2006.01)
*H04B 7/04*   (2006.01)
(Continued)

(52) U.S. Cl.
CPC ............ *H04B 7/0413* (2013.01); *H04B 7/0608* (2013.01); *H04B 7/082* (2013.01); *H04B 7/0814* (2013.01); *H04B 7/0491* (2013.01)

(58) Field of Classification Search
CPC ...... H04B 7/02; H04B 7/0413; H04B 7/0491; H04B 7/0814; H04B 7/0608
USPC .......................................... 375/267, 260, 259
See application file for complete search history.

(56) References Cited

U.S. PATENT DOCUMENTS 6,320,898 B1 * 11/2001 Newson et al. ............... 375/144
7,853,294 B1 * 12/2010 Ngan ........................ 455/562.1
(Continued)

FOREIGN PATENT DOCUMENTS

EP         2506625 A1 * 10/2012

OTHER PUBLICATIONS

Hanif et al: "MIMO Cognitive Radios with Antenna Selection", IEEE Transactions on Wireless Communications, IEEE Service Center, vol. 10, No. 11, Nov. 1, 2011, pp. 3688-3699.

(Continued)

*Primary Examiner* — Kevin M Burd
(74) *Attorney, Agent, or Firm* — Jack Schwartz & Associates, PLLC

(57) ABSTRACT

A method of selecting antenna segments for transmission and/or reception in a MIMO wireless transmission system using sectorized directional antennas, includes the steps of selecting, from an initial set of ranked link antenna patterns, a link antenna pattern having the best average rank, at predetermined time intervals, successively selecting a subset of link antenna patterns having average ranks within a predetermined distance to the best average rank, determining an average link performance of the link antenna patterns selected in the preceding step, determining an average rank of the link antenna patterns, for which the average link performance has been determined in the preceding step, selecting the link antenna pattern having the best average rank, and repeating the process at the next predetermined time interval.

16 Claims, 12 Drawing Sheets

(51) Int. Cl.
*H04B 7/06* (2006.01)
*H04B 7/08* (2006.01)

(56) References Cited

U.S. PATENT DOCUMENTS

| | | | |
|---|---|---|---|
| 8,102,830 B2 | 1/2012 | Yokoi et al. | |
| 2005/0003865 A1 | 1/2005 | Lastinger et al. | |
| 2006/0234777 A1 | 10/2006 | Vannithamby et al. | |
| 2008/0125047 A1* | 5/2008 | Li et al. | 455/63.1 |
| 2010/0034133 A1 | 2/2010 | Marom et al. | |
| 2011/0009105 A1 | 1/2011 | Lee et al. | |
| 2014/0141791 A1* | 5/2014 | Razavi | H04W 16/28 455/452.1 |

OTHER PUBLICATIONS

Subramanian et al: "Topology Control Protocol Using Sectorized Antennas in Dense 802.11 Wireless Networks", Network Protocols, 2009, 17th IEEE International Conference on, IEEE, Oct. 13, 2009, pp. 1-10.

Zhou et al: "Multiple Antennas Selection for Linear Precoding MISO Cognitive Radio", Wireless Communications and Networking Conference, 2009. WCNC 2009. IEEE, IEEE, Apr. 5, 2009, pp. 1-6.

Kim et al: "MIMO wireless networks with directional antennas in indoor environments", INFOCOM, 2012 Proceedings IEEE, IEEE, Mar. 25, 2012, pp. 2941-2945.

Hermozilla et al: "Improving MIMO capacity with drective antennas for outdoor-indoor scenarios"; IEEE; May 2009; pp. 414-418.

Bicket et al: "Bit-rate selection in wireiess networks" PhD dissertation_MIT Boston, MA, USA, 2005; pp. 1-50.

Razai-Ghods et al: "Characterization of MIMO propagation channels using directional antenna arrays", Proc. IEEE Sarnoff Symp., Mar. 2004, pp. 163-167.

Search Report Dated Apr. 12, 2013.

Marom et al., "MIMO Systems with one directional antenna", 2010 IEEE 26th Convention of Electrical and Electronics Engineers in Israel, Nov. 17, 2010, pp. 384-387.

Uchida et al., "A low-profile dual-polarized directional antenna for an indoor MIMO transmission", 2010 IEEE Antennas and Propagation Society International Symposium, Toronto, Ontario Canada, Jul. 11, 2010, pp. 1-4.

Wang et al., "A Three-Cell coordinated Network MIMO with fractional frequencyl reuse and directional antennas", Proceedings of IEEE International Conference on Communications, ICC 2010, Cape Town, South Africa, May 23, 2010, pp. 1-5.

* cited by examiner (a)

(b)

(a)

(b)

METHOD OF, AND APPARATUS FOR, CONTROLLING A WIRELESS CONNECTION IN A MIMO SYSTEM USING MULTI-SECTOR DIRECTIONAL ANTENNAS

This application claims the benefit, under 35 U.S.C. §365 of International Application PCT/EP2013/054994, filed Mar. 12, 2013, which was published in accordance with PCT Article 21(2) on Sep. 19, 2013 in English and which claims the benefit of European patent application No. 12305307.6, filed Mar. 15, 2012.

FIELD OF THE INVENTION

The present invention pertains to a method of controlling a wireless connection in a MIMO system, in which at least one of the multiple antennas of the system is a directional antenna that uses two or more antenna sectors, at least one of which is selectively activated for obtaining a directional antenna radiation characteristic, or pattern. In the context of this specification MIMO is an acronym for Multiple Input Multiple Output. MIMO generally relates to wireless transmissions using multiple antennas for transmission and reception, providing multiple combinations of transmitting and receiving antennas and corresponding signal propagation paths. MIMO can provide improved link reliability through diversity gain and/or improved spectral efficiency through array gain by spreading the total transmission power over the multiple antennas.

BACKGROUND OF THE INVENTION

With the growing trend toward unified communications, IPTV, collaborative applications in homes and enterprises, and the corresponding increasing demand for high throughput wireless communication, Multiple Input Multiple Output (MIMO) has become one of the key technologies for future wireless networks. MIMO combines multiple omni-directional antennas with signal processing techniques to extend the dimension of available radio resources to the time, frequency and space. Adopted in many standard protocols, e.g. IEEE 802.11n Part 11, it has been widely deployed to transport streamed voice and high-definition video traffic which requires high throughput.

Another wireless technology that has long been receiving interests is directional antennas, which use predetermined narrow beams to focus RF energy toward desired receivers. This achieves throughput gains and reduces interference. Moreover, the directivity of antennas facilitates determining proper orientation of the antenna, notably in outdoor environments allowing for a line-of-sight path. Recently, it has been shown that directional antennas in indoor environments provide a few strong paths between nodes even in absence of a line-of-sight path.

The combination of MIMO and directional antennas has been discussed by N. Razai-Ghods, M. Abdalla and S. Salous in "Characterization of MIMO propagation channels using directional antenna arrays," Proc. IEEE Sarnoff Symp., Princeton, N.J., USA, March 2009. However, the results are based upon fixed orientation of the directional antennas, which led to the conclusion that the benefit of using directional antennas is marginal at best.

C. Hermozilla, R. Feick, R. A. Valenzuela and L. Ahumada, in "Improving MIMO capacity with directive antennas for outdoor-indoor scenario," IEEE Trans. Wireless Comm., vol. 8, no. 8, pp. 2177-2188, May 2009, discuss using MIMO and directional antennas in a scattering-poor environment.

In a related field, using MIMO and directional antennas, "Demystifying beamforming", (http://www.nowire.se/produktblad/Ruckus/Beamforming-WP-030909.pdf), by Ruckus Wireless, Inc., Sunnyvale, Calif., USA, discusses collecting packet error rates for determining the orientation of multiple antennas. A related rate adaptation algorithm is discussed by J. C. Bicket in "Bit-rate selection in wireless networks", PhD dissertation, MIT, Boston, Mass., USA, 2005.

U.S. 2006/0234777 A1 discloses a radio access network having multiple sectors and comprising two or more sector transmitters serving respective sectors for transmitting data to mobile stations.

Muhammad Fainan Hanif, Peter J. Smith, Desmond P. Taylor and Philippe A. Martin, in "MIMO Cognitive Radios with Antenna Selection", IEEE Trans. Wireless Comm., vol. 10, no. 11, pp. 3688-3699, November 2011, discuss using antenna selection to jointly satisfy interference constraints in multi-primary-user environments while improving achievable rates.

Jun Zhou, John Thompson and Ioannis Krikidis, in "Multiple Antennas Selection for Linear Precoding MISO Cognitive Radio", Wireless Communications and Networking Conference, 5 Apr. 2009, discuss antenna selection algorithms for frequency reuse in cognitive radio settings.

Anand Prabhu Subramanian, Henrik Lundgren, Theodoros Salonidis and Don Towsley, in "Topology Control Protocol Using Sectorized Antennas in Dense 802.11 Wireless Networks", present a measurement-based optimization framework for minimizing network interference and maximizing network capacity.

SUMMARY OF THE INVENTION

It is an object of the present invention to control a MIMO wireless access point having at least one multi-sector directional antenna in an advantageous manner so as to maintain high throughput gain by changing the structure of MIMO channels, even without additional directivity gain. Another object is avoiding unstable link quality and link throughput in a MIMO environment. The invention is based on the finding that, depending on which sectors of an antenna are activated, throughput may increase or drop when compared to using only omni-directional radiating antennas, and that increased or dropped throughput are found only in a small subset of activation patterns. Activation pattern in this specification refers to which sectors of an antenna are active in a transmission. The invention is further based on the finding that activation pattern having an increased throughput largely depend on the environment and are not associated with the number of activated sectors, Tx or Rx sector activation, or antenna orientation. The invention is yet further based on the finding that the interference level, when multi-sector antennas are used, is proportional to the number of activated sectors. By determining a subset containing only high performing antenna configurations, out of which the one configuration having the best average rank for average throughput is selected, the inventive method avoids selecting sector patterns that show poor performance, as might occur in case of arbitrary pattern selection once a performance threshold is no longer met. The inventive method thus reduces the probability of a link loss due to selecting a low performance antenna pattern. The high-performing antenna sector patterns are determined in accordance with an average rank metric determined over a predetermined time and at different times of a day and/or days of the week. The inventive method generally provides a higher average throughput over any chosen time period when compared to existing MIMO wireless access points, while reducing the time needed for probing in case of a connection falling below predetermined performance thresholds. In addition, the inventive method may, depending on actual configuration, reduce interference with other devices operating in the vicinity through selection of appropriate antenna pattern or antenna configurations, increasing spatial reuse.

As already indicated above, simply combining MIMO and directional antennas not necessarily produces only benefits. For example, consider a point-to-point MIMO in an outdoor environment. MIMO achieves capacity gains in rich scattering multi-path environments. Outdoor environments, however, typically have a single strong line-of-sight path, and a directional antenna would decrease the capacity of a MIMO link. In contrast, it is not immediately apparent how directional antennas for MIMO would perform in environments providing rich scattering multi-path, e.g. indoor environments. On one hand, one may argue that directional antennas might decrease the capacity of MIMO links, due to reduced multi-path or signal scattering resulting from its narrow beams. On the other hand, however, directivity might change the structure of propagation paths, which structural changes and signal increase by directivity could improve the link capacity.

In accordance with the invention an antenna selection unit is adapted to selectively activate different antenna elements of an antenna system for creating different directional antenna patterns, for transmission, Tx, and/or for reception, Rx. In the following specification the expression 'link antenna pattern' refers to the Tx-Rx combination of directional antenna pattern at the transmitter and receiver node, respectively, of a wireless link between two MIMO wireless nodes. In accordance with the invention a set of link antenna pattern is determined that maximize link throughput, out of which link antenna pattern a selection is made in case the link performance drops below a predetermined threshold level. Link performance may be determined in terms of measured throughput, signal-to-noise ratio, or SNR, received signal strength, or RSS, packet error rate, or PER, and the like. In accordance with the invention, one or more of the link performance metrics are determined for each one of the link antenna patterns of the set. During operation, at certain time intervals, or when usage of the wireless link is low, one or more of the link antenna pattern from the set are selected and the link performance measurement is performed. The link performance measurement is done for a certain time period to obtain an average result. The pattern are assigned a rank in accordance with their average results, and are selected according to their rank, i.e. the pattern showing the best average rank is selected.

In accordance with a method in accordance with one aspect of the invention, in an initial measuring step, sectors in each of the multiple antennas are selectively activated in such a way that successively a multiplicity of, or even all, possible combinations of activated sectors for all antennas, or link antenna patterns, are established, including activation of multiple sectors on one or more of the antennas. This step successively establishes a multiplicity of directional radiation beam forms for transmitting, and directional reception sensitivity pattern for receiving, for each antenna. It is to be noted that the transmission and the reception pattern of each individual device may be different. For each pattern a different diversity environment is generated, which may exhibit signal paths that are advantageous in accordance with the MIMO principle. In addition, the different antennas may be fed with different shares of the total transmission power, further varying the signal propagation on the various signal paths. For each of the multiplicity of combinations of activated antenna sectors and transmission power applied to individual antennas a received signal strength, throughput, and/or error rate, or, more general, link performance is determined. Error rate may include bit error rate, packet error rate, block error rate, and the like. The determination may be done by sending predefined data packets and receiving, from the receiver, corresponding information about the data received, or in any other known manner. The information so obtained is stored in a memory and the link antenna pattern are ranked in accordance with the stability of link performance over time and the respective throughput achieved. Details of the ranking will be discussed further down in this specification.

The measurement may be repeated one or several times, immediately or after a longer period of time, in order to establish information about the temporal stability of a specific antenna combination. The measurement may also be repeated at different times of a day, or at different days of the week, in order to be able to provide maximum performance under varying environmental conditions that, in a regular manner, depend on the time of the day or the day of the week.

In accordance with the present invention, combinations of activated antenna sectors, or sector patterns, that provide the a throughput above a predetermined threshold are combined into sets of sector patterns, the sets providing at least one combination at any time during use that provides a throughput better than a predetermined threshold. During operation, the wireless access point may select from the predetermined sets of sector patterns, even at short intervals, e.g. seconds, in order to maintain the best possible throughput at any time. A set may be valid for a certain time of the day, or for a certain day of the week.

During operation, for all link antenna patterns of a set of link antenna patterns, an average link performance is determined at predetermined time instants. The average link performance can be, for example, a moving average over a predefined number of past instantaneous link performance values, or an exponential average. The link antenna patterns are sorted in accordance with the average link performance to obtain instantaneous ranks for each of the predetermined time instants. Then the average rank of each link antenna pattern is determined for each of the predetermined time instants. The average can be a moving average over a predetermined number of past instantaneous ranks, or an exponential average. Once the average ranks are determined the link antenna pattern currently having the best average rank is selected for transmission.

In order to reduce the time and overhead required for testing during normal operation, in subsequent test and selection operations only a predetermined number of link antenna patterns having an average rank within a certain proximity to the best average rank are selected, and their respective instantaneous link performance and corresponding average link performance and average rank is determined. The average ranks for patterns not selected for repeated measuring remain the same as before. Once the subsequent testing has been done, the link antenna pattern having the best average rank is selected. This process is repeated at predetermined time instants.

The larger the number of link antenna patterns in the set of link antenna patterns, the more time is required to find the pattern with the best average rank. However, the probability of finding the link antenna pattern having the highest link performance is also increased. The set size can be reduced once a stable set of link antenna patterns consistently having good average ranks is found.

The time intervals, at which the probing occurs, as well as the duration of the probing itself can be dynamically adapted depending upon how frequently the link antenna pattern with the best average rank changes. For example, in indoor systems, the pattern with the best link performance typically changes in a small time scale, following channel characteristics in typical indoor environments with people moving around. Thus, to most accurately track the channel variation, the time interval should be significantly shorter than the coherence time, which is typically around 1 second. On the other hand, one may choose a few or tens of seconds, willing to accept less accurate tracking, but amortizing the probing overheads over time.

BRIEF DESCRIPTION OF THE DRAWINGS

In the following the invention will be described in more detail with reference to the drawings, in which

FIG. 11 exemplarily shows the throughput gains for different numbers of link antenna patterns to select from;

DETAILED DESCRIPTION OF PREFERRED EMBODIMENTS

Figure 1:
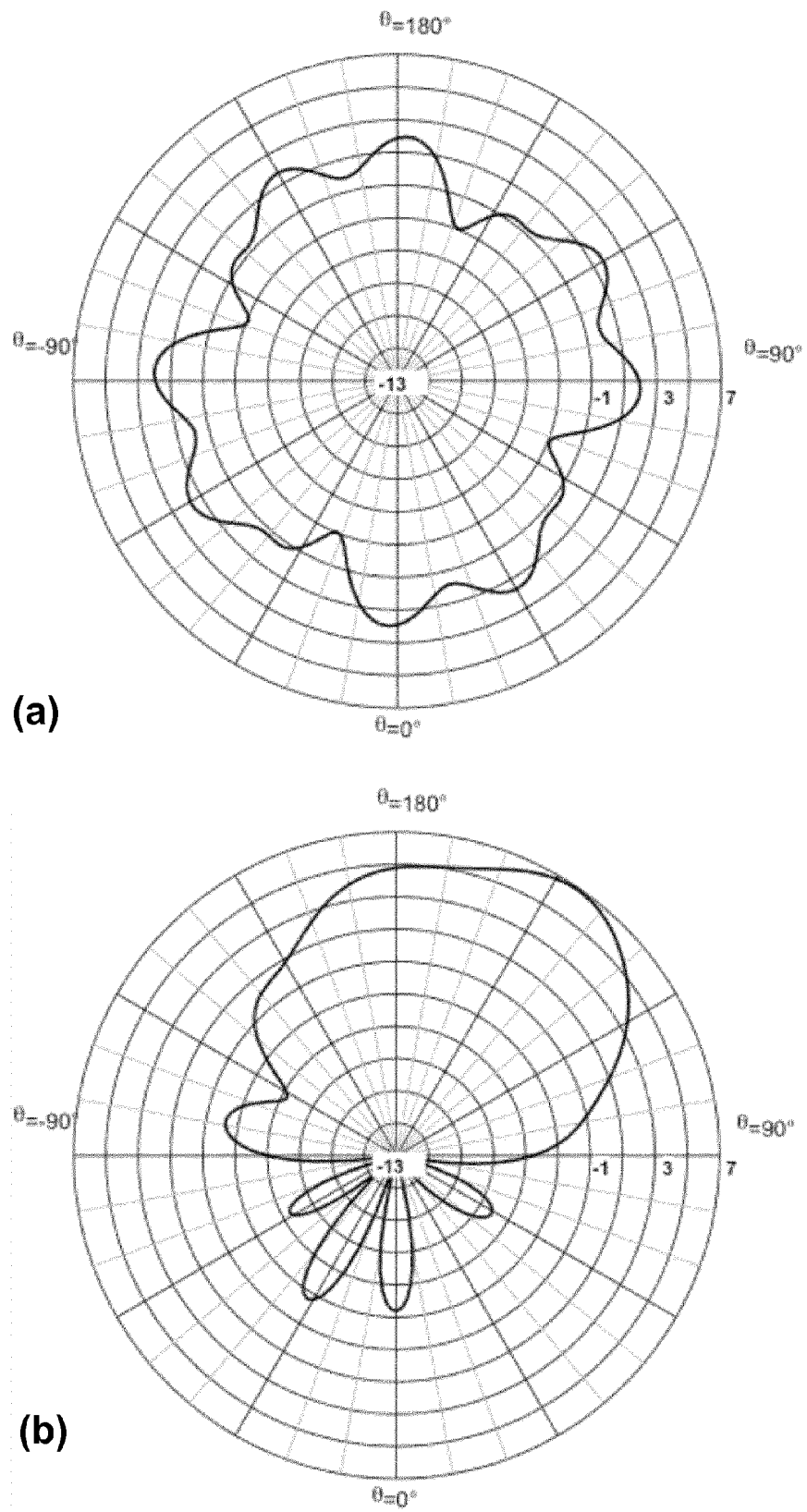
FIG. 1 shows exemplary radiation patterns of a multi-sector antenna without feeding loss.
Figure 13:
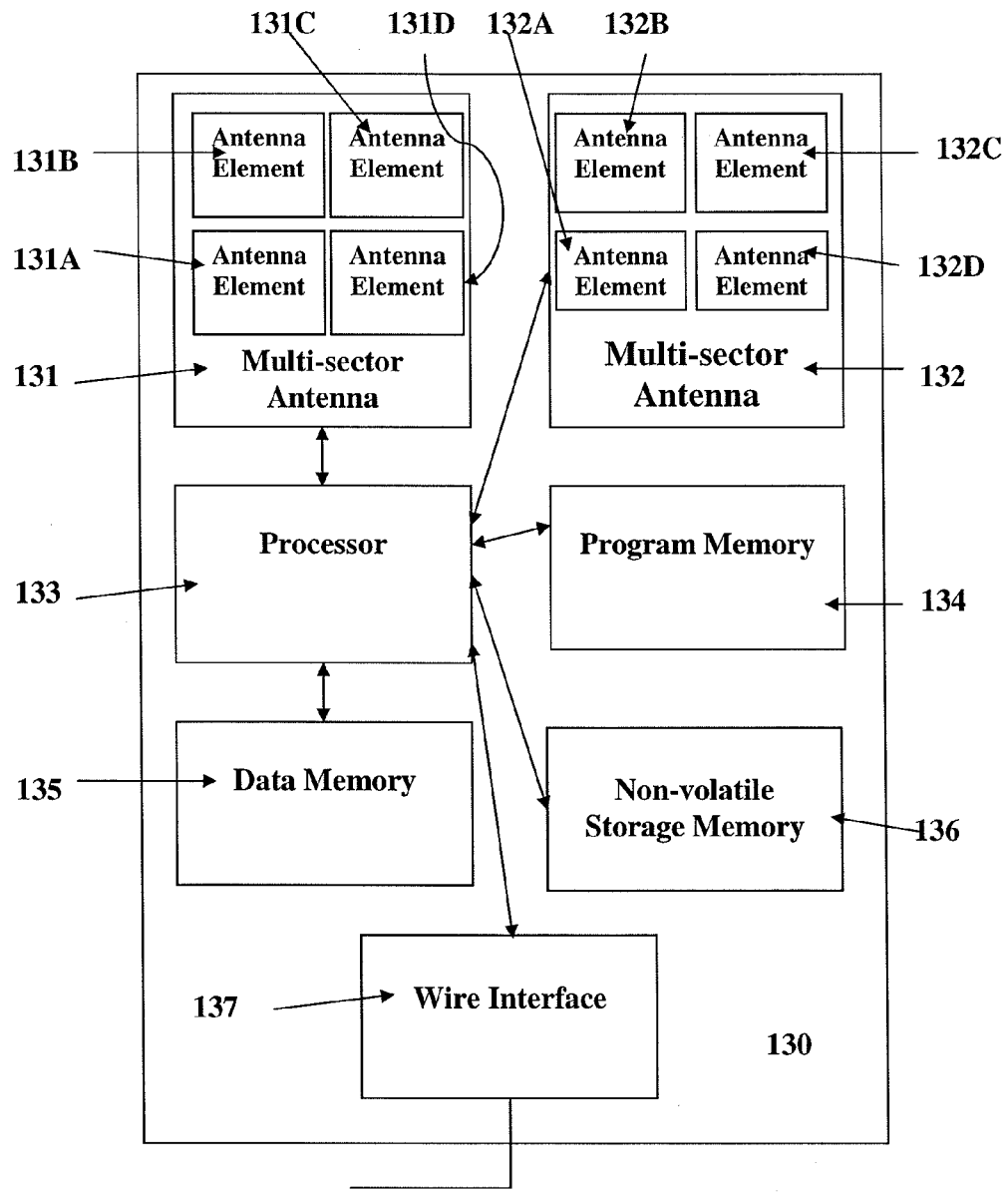
FIG. 13 exemplarily shows a block diagram of the MIMO system in accordance with invention principles.

As shown in FIG. 13, an exemplary apparatus 130 in accordance with the invention is provided with at least two multi-sector antennas 131 and 132, each having four antenna elements 131A-131D and 132A-132D, respectively. In one embodiment the antenna elements 131A-131D and 132A-132D provide no directivity gain. The apparatus 130 further has a processor 133, a program memory 134 adapted to store program information during execution of the program information, and a data memory 135 adapted to store data during execution of the program information. The apparatus 130 may further have a non-volatile storage memory 136, e.g. of the flash-memory type or electric erasable programmable ROM (EEPROM) type, for non-transitory storage of program information and/or data used during executing the program information. Other types of non-volatile storage memory 136 are also conceivable, including optical or magnetic storage, and client/server data storage. The apparatus 130 may further be equipped with a wired interface 137 for receiving and transmitting data, e.g. for connecting to LAN or to a host device. The wired interface 137 may be, for example, of the USB type, or of the IEEE 802.3 type. Other types of wired interfaces are also conceivable. Directivity gain is used for indicating the additional antenna gain of a directional antenna toward one direction compared to an omni-directional radiation pattern. In one exemplary embodiment, the antenna elements 131A-131D and 132A-132D are printed on a printed circuit board, or PCB, covering the entire horizontal plane in the 5 GHz band of IEEE 802.11n. Any combination of sectors can be activated for transmission or reception through a feeding network, the combinations referred to hereinafter as sector activation pattern or simply sector pattern. This results in $2^4-1=15$ different activation patterns, out of which one is 'all four sectors activated', resulting in an omni-directional pattern, hereinafter referred to as omni-mode. FIGS. 1(a) and 1(b) depict the radiation patterns with one and four activated sectors, respectively. Table I shows that the antenna directivity gain for each pattern depends on both number of activated sectors and, for the case of two activated sectors, on whether they are opposite (2 opp) or adjacent (2 adj).

| pattern: | omni | 3 sector | 2 adj | 2 opp | 1 sector |
|---|---|---|---|---|---|
| directivity gain [dBi] | 2.4 | 3.5 | 4.6 | 5.7 | 6.9 |
| feeding loss [dB] | 0 | −1.25 | −3 | −3 | −6 |
| overall gain [dBi] | 2.4 | 2.25 | 1.6 | 2.7 | 0.9 |

It is readily apparent that the directivity gain is higher for antenna patterns with less activated sectors. However, the antenna feeding network has been designed to introduce a feeding loss such that all antenna patterns exhibit approximately equal peak gains. This design decision was made to reduce directional terminal problems in multi-hop mesh networks.

Figure 2:
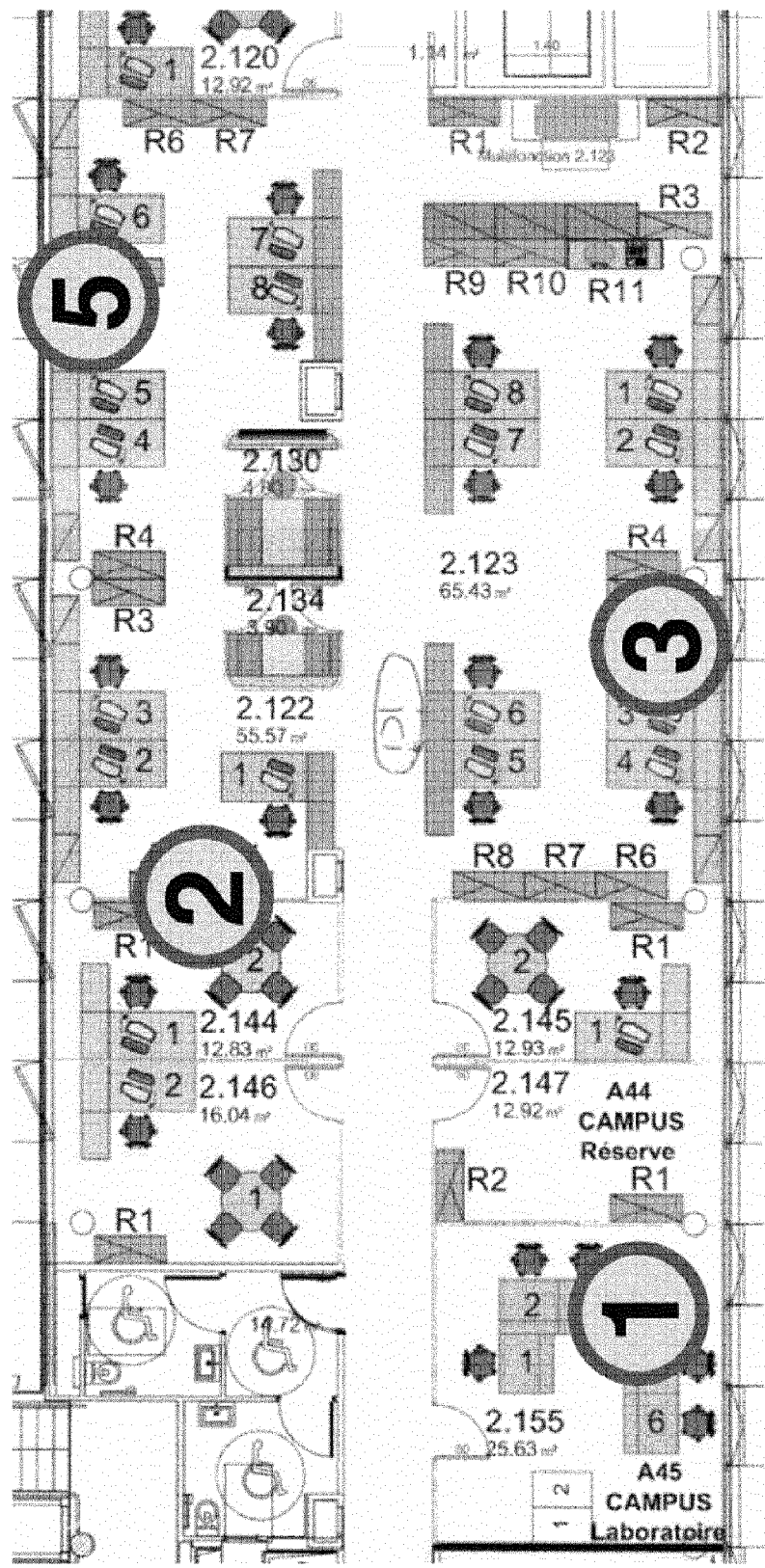
FIG. 2 represents an exemplary indoor environment, in which the invention can be used.

An exemplary test setup is deployed in a single floor in a typical laboratory space, as shown in FIG. 2. This is a typical office environment consisting of cubicles, booths and offices separated by glass walls. Due to the availability of multi-sector antennas, only four nodes are needed. Different topologies can be emulated by transmission power, or Tx power, control.

The exemplary measurement results presented in this specification have been obtained using UDP throughput as link performance metric. In order to measure the maximum throughput of a MIMO link with multi-sector antennas, the large number of activation patterns and possible temporal variations need to be taken into account.

In a M×M MIMO system with K MCS data rates, where both transmitter, Tx, and receiver, Rx, use multi-sector antennas of s sectors each, testing all combinations requires $K \times (2^{s-1})^{2M}$ throughput measurements. This corresponds to 810,000 throughput measurements the exemplary system, where M=2, s=4 and K=16. For the present invention this issue was addressed in two ways. First, the number of activation patterns considered for each link is restricted. Specifically, sector activation is performed at either Tx or Rx, i.e. transmitter or receiver, with the other end of the link in omni-mode. It is to be noted that in current 802.11n WLANs only Tx beam-forming is performed at the Access Point (AP) and the client has omni-directional antennas. Moreover, the number of active sectors is kept the same for each antenna. This reduces the number of considered antenna patterns from $(2^8-1)^{2M}$ to $\Sigma_{x=1}^{s-1}(_x^s)^M$, i.e. $\Sigma_{x=1}^{3}(_x^{4s})^2=68$ in this special case. A pattern set is referred to as a choice of Tx or Rx and the number of active sectors per antenna. Second, multiple MCS rates are coped with using UDP throughput vs. SNR, or signal to noise ratio, mappings. In addition to Received Signal Strength, or RSS, provided by most 802.11 wireless devices, the hardware used in the exemplary setup stores SNR information for each received packet. If a packet is encoded in the SDM mode, a pair of SNR values (SNR per spatial stream) is available, and, if encoded in the STBC mode, a single SNR value is available.

In an exemplary series of measurements hardware specific SNR information is mapped to UDP throughput. The UDP throughput of each MCS rate is measured for 5 seconds with each of the restricted pattern sets, using iperf and tcpdump tools. The duration of 5 seconds measurement has been identified as sufficient by testing. The traffic load is set to be higher than each MCS rate. The SNR values are averaged and mapped to the throughput. For SDM mode packets, each SNR value pair is combined to a single effective SNR for one-to-one mapping to the throughput. The effective SNR is thus a single representative SNR for a pair of SDM-mode SNR values.

Figure 3:
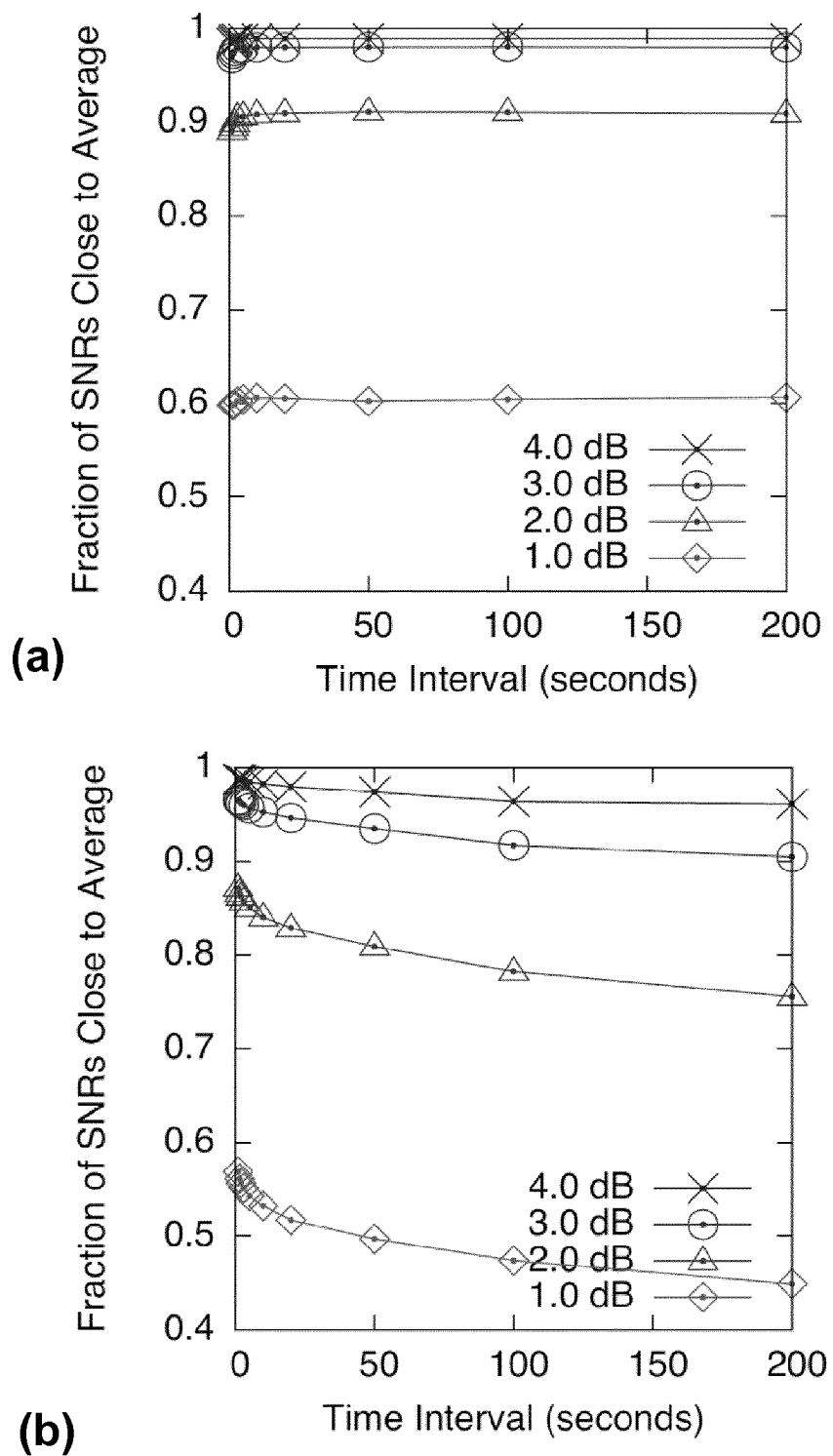
FIG. 3 exemplarily shows fractions of SDM effective SNR samples in relation with the long term average.

As mentioned above, the measurement results for different activation patterns may be affected by time variation of wireless channels. To quantify this impact, the fraction of SDM effective SNR samples which fall into ±δ dB range of the long term average is measured. FIG. 3 shows these results for different δ. At night, only 10% of the samples deviate 2 dB from the long term average, even for time intervals up to 200 s, see FIG. 3 (a). In daytime, see FIG. 3 (b), around 15% of the samples deviate 2 dB for time intervals of 20 seconds, which is close to the 1 dB granularity of the 802.11n device used. To further minimize the outliers' effect, all measurements were performed at night, unless specified otherwise, throughputs for each activation pattern and omni-mode back-to-back were measured, and only their respective differences were considered.

Figure 4:
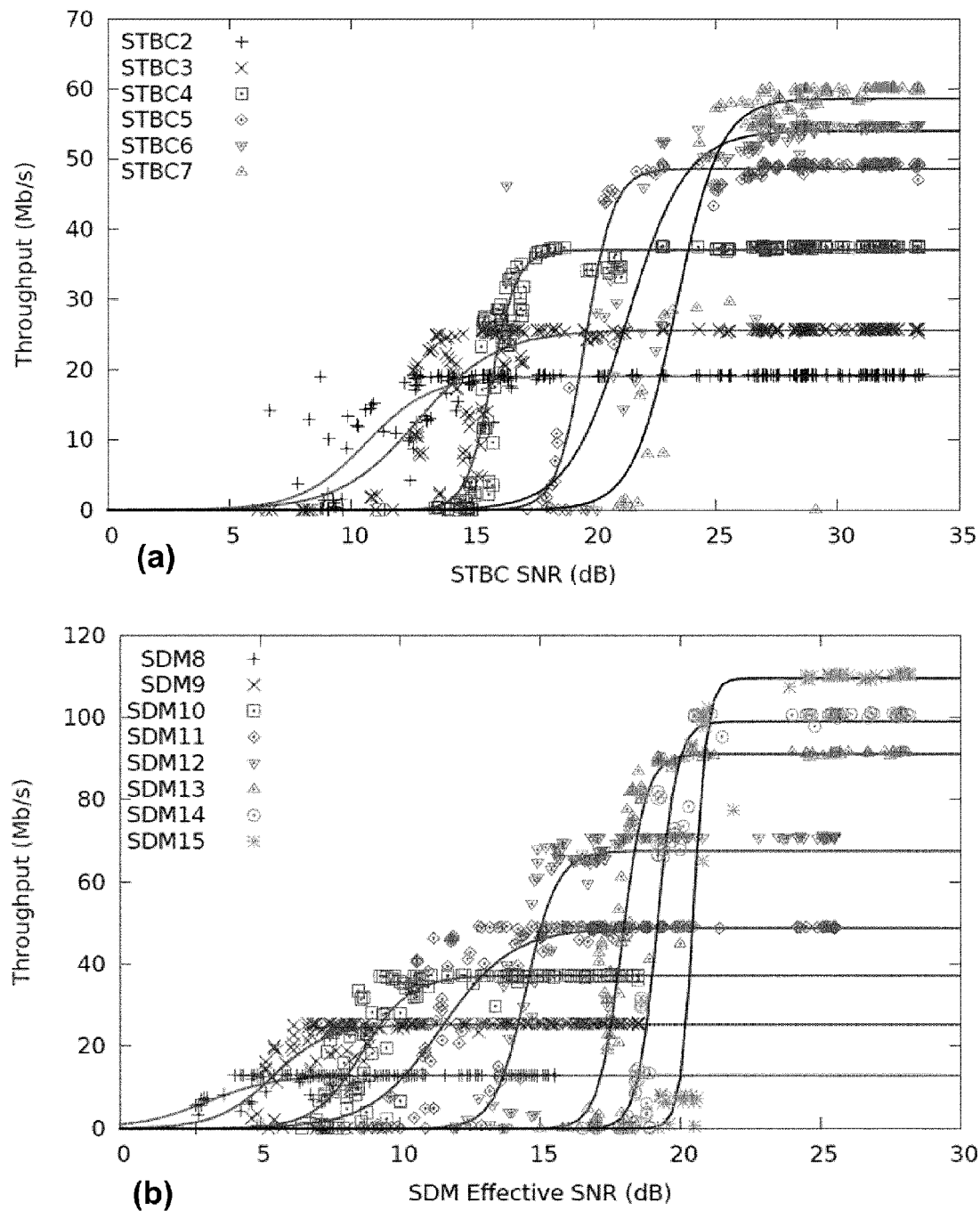
FIG. 4 shows exemplary STBC SNR and SDM effective SNR to throughput relationships.

FIG. 4 exemplarily shows averaged throughput samples and corresponding SNR or effective SNR values for an exemplary wireless device. For generating the mappings, a generalized Sigmoid function is fit to each set of throughput samples with the same MCS rate. The throughput of a link using a certain antenna pattern is estimated by measuring the STBC SNR value and SDM effective SNR value, mapping these two SNR values to throughputs using the mappings, and choosing the maximum of these two throughput values.

In order to quantify the throughput gains of MIMO sector activation over omni-mode transmissions the same exemplary test setup as before is used. Again, the SNR of omni-mode is measured in a back-to-back fashion for obtaining the throughput gain using the same mapping as before. For obtaining reliable results, each measurement is repeated five times and the results are averaged. The impact of RSS, number of activated sectors, Tx or Rx sector activation, location of the devices, directivity gain and temporal throughput variation for various sector pattern is determined.

Figure 5:
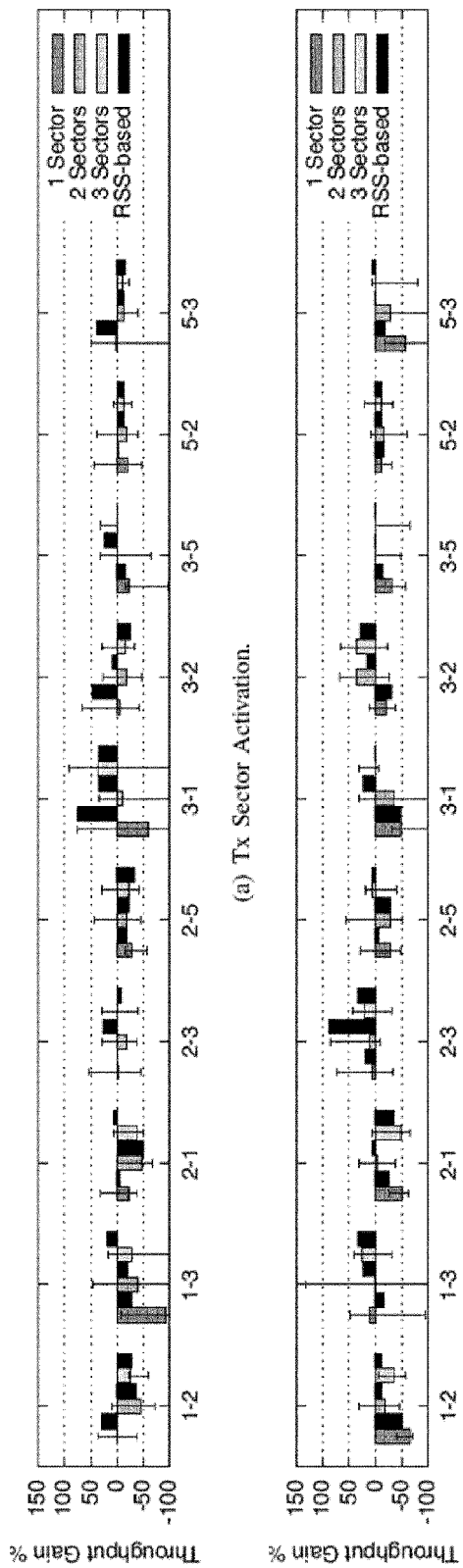
FIG. 5 exemplarily shows the throughput gain for various combinations of active sectors.

FIG. 5 shows the throughput gains for antenna patterns with both Tx and Rx sector activations. Each gray bar in FIG. 5 shows the median gain for one, two or three activated sectors per antenna; the error bars represent maximum and minimum throughput gains. Black bars represent the throughput gain for the pattern with the highest RSS. Most links achieve a positive maximum throughput gain over omni mode, at most 130% on link 1-3 with 2 Rx sectors per antenna and 21% averaged across all links. This appears counter-intuitive because, as mentioned earlier, the multisector antennas used in the exemplary test setup do not provide antenna directivity gain over omni mode. Since multi-sector antennas transmit or receive at equal or less signal power, and some of diverse paths between Tx and Rx are suppressed, one might argue that it would not be possible to observe positive throughput gains. The positive throughput gains are due to the clustered propagation of signals in the angular domain. Propagation measurements in indoor environments have shown that the angles of departure, AoD, and arrival, AoA, form correlated signal clusters. Moreover, only 2 to 4 clusters contribute to the received signals. The antenna patterns that achieve positive throughput gains, are aligned in phase with these dominant signal clusters, thus avoiding negative gains, but also misaligned with other clusters that induce signal correlations at the antenna input. This misalignment reduces the received signal correlation, making the MIMO channel matrix appear de-correlated. Therefore, sector activation without directivity gain can create throughput gain by structurally changing the MIMO channel. Despite the potential for a high positive maximum throughput gain, FIG. 5 also shows that most links achieve negative median throughput gain, −9.3% on average, and the minimum gain can reach as low as −100%, e.g. link 1-3 for 2 Rx sectors per antenna. Thus, less than half antenna patterns provide positive gains and if a sector activation pattern is not carefully chosen, it may yield a high penalty on throughput performance. The measurement results represented in FIG. 5 clearly show that the maximum throughput gains do not depend on the number of activated sectors or whether Tx or Rx activations are used.

For most node pairs (x,y) in FIG. 5, the performance of link x-y with Tx activation can be radically different to the performance of reciprocal link y-x with Rx activation. Thus, in general links are not symmetric and link reciprocity cannot be leveraged to reduce measurement overhead. This holds for both Tx and Rx activation, in FIGS. 5(a) and 5(b), respectively. Thus, without antenna directivity gain, RSS cannot predict throughput gain with sufficient accuracy.

FIG. 5 also shows that co-located links show radically different performances. For example, consider links 2-3 and 5-2 that share node 2. Link 2-3 achieves positive maximum throughput gains for both Tx and Rx activations, positive median throughput gains for Rx activation, and RSS-based throughput gains are close to maximum throughput gains for Rx activation. In contrast, link 5-2 achieves positive maximum throughput gains only for Tx activation, has negative median throughput gains, and RSS-based throughput gains are all close to the median throughput gains. Based on the above observations, the throughput gains appear "arbitrary." However, the inventors have found that it is the environment that is "arbitrary" in terms of signal scattering, and that sector activation changes the structure of MIMO channels, which depend highly on the surrounding environment. The relationship between Tx and Rx antenna signals in a M×N MIMO channel is $y = \gamma \cdot Hx$ where x is an 1×M input vector, or Tx symbol vector, γ is a scalar path loss-based channel gain, H is the M×N MIMO channel matrix, and y is an 1×N output vector, or Tx symbol vector. The previous observation that RSS is not a good indicator of the throughput gain means that the major contributor to throughput gain is the structure of MIMO channel matrix H rather than the scalar gain γ.

Existing studies state that the structure of H highly depends on the surrounding environments of a link and the resultant paths. Notably in indoor environments, the surroundings for each link are noticeably different and lead to different throughput gain characteristics across activation patterns.

As mentioned before, antenna directivity gain can be created by reducing transmit power in omni-mode. The network interface card, or NIC, used in the exemplary test setup supports transmit power control in 3 dB increments, which allows for compensating for feeding loss of the multisector antennas when the number of active sectors is one or two, see table 1. Since feeding loss for three active sectors is 1.25 dB, pattern sets with 3 active sectors are not considered in the following.

Figure 6:
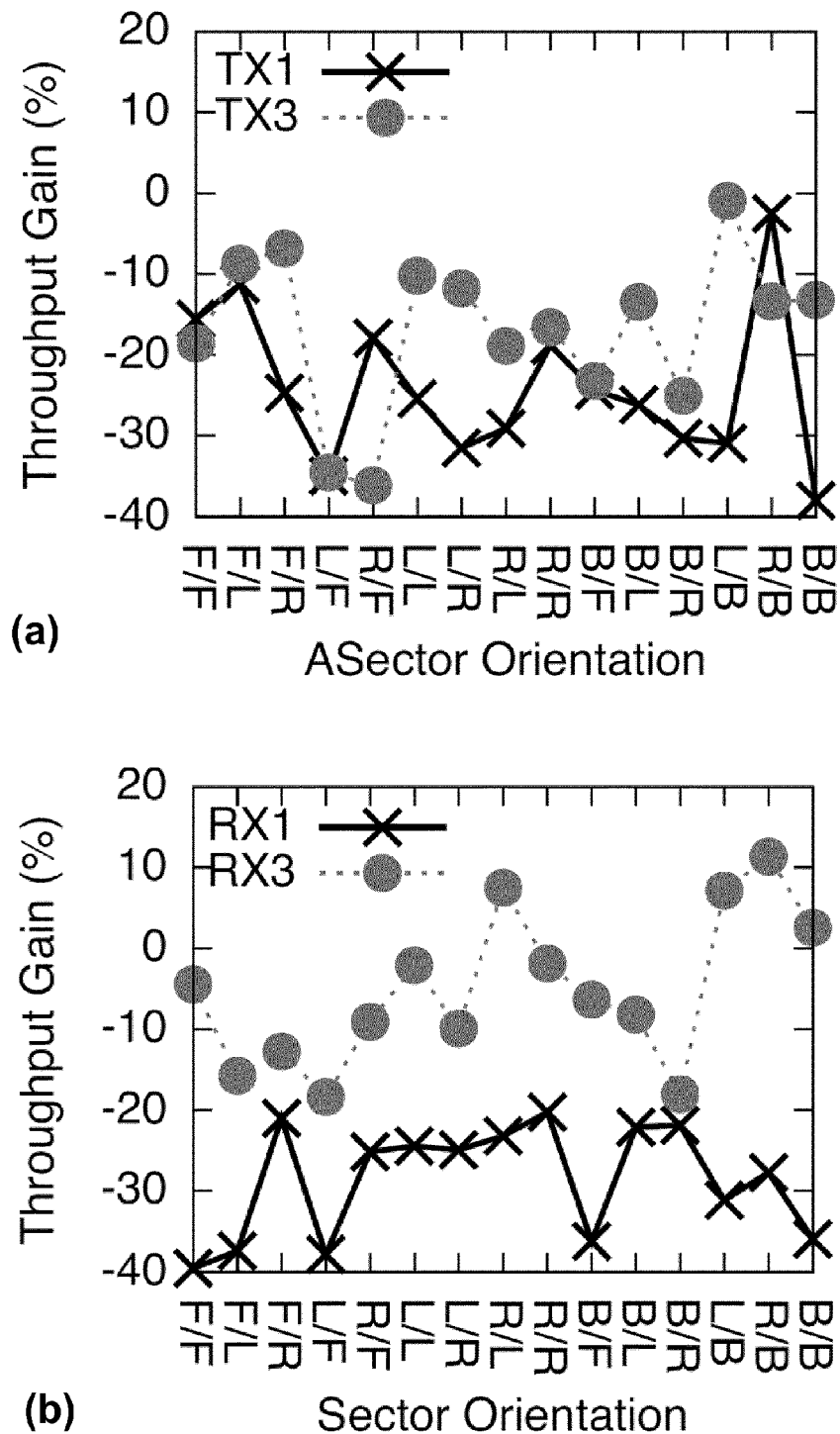
FIG. 6 exemplarily shows the throughput gain vs. orientation of active sectors.

FIG. 6 depicts the average throughput gains over all links, as a function of antenna pattern orientations sorted by geographical direction of activated sectors toward the other end of the link. TX1 and TX3 indicate 1 Tx and 3 Tx sector activation patterns, respectively. RX1 and RX3 correspond to Rx activation. F, L, R and B indicate face, left, right and back orientation, respectively. For example, F/F in TX1 (or TX3) both antennas in a two-antenna MIMO system have active Tx sectors facing the receiver. Unlike the case with a single sectorized antenna per node, the geographical relationship is not correlated with throughput gains, again regardless of number of active sectors and Rx or Tx activation.

Figure 7:
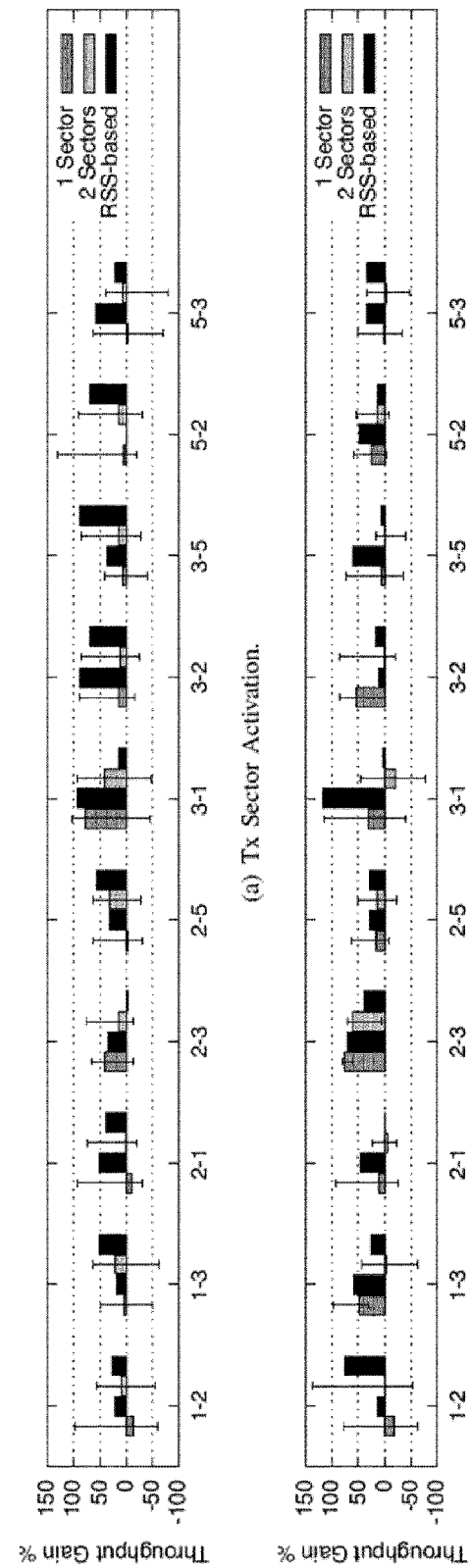
FIG. 7 exemplarily shows the throughput gains per link with antenna directivity gain.

FIG. 7 shows the throughput gains per link with antenna directivity gain. The maximum and median throughput gains are 71% and 14%, respectively. With careful choice on a sector activation pattern set, some links like 1-2 and 3-2 exhibits maximum gain that exceeds 100%. Also, the median gains for link 1-3, 2-3 and 3-2 exceed 50%. Overall, the median gains are positive in 11 pattern sets out of 80, implying that more than half of activation patterns in each pattern set are likely to provide higher throughput than omni-mode. Therefore, the emulated directivity gain increases Rx signal level represented by y even with MIMO. This effect was previously confirmed only for single-antenna systems.

In FIG. 7, the number of activated sectors does not affect much the throughput gains. For all 10 links, 5 links show competitive throughput gains of both 1 and 2 activation regardless of Tx or Rx activation. Similar to the case without directivity gain, FIG. 7 also reveals the arbitrary appearance of throughput gains for various link locations and reciprocal configurations. The geographical relationship does not provide any indication of the throughput gain either (graph not shown). Again, these observations can be interpreted as the results of the differences between surrounding environments.

As in FIG. 5, FIG. 7 black bars represent the RSS-based throughput gains. RSS-based activation results in higher throughput than median in 34 pattern sets out of 40. Moreover, 10 pattern sets are within 10% of the maximum throughput gains.

It is thus concluded that, despite the arbitrary surroundings of the indoor environment, the RSS values successfully represent throughput gains when antenna directivity gain is present.

Having found that RSS can be good metric for throughput gains if antenna directivity is present, it might still be necessary to probe the RSSs of all patterns in a pattern set. This would be expected because the other spatial criteria considered above did not show any correlation. The inventors have found, however, that, by exploiting temporal properties, it is not always necessary to probe all patterns.

In an exemplary test the SNR measurement for activation pattern, without subsequent omni mode measurement, was performed from the patterns in 1 Tx, 1 Rx, 3 Tx and 3 Rx activation pattern sets. Links 2-1, 2-3 and 2-5 are considered without antenna directivity gain. All patterns for each set were probed, and probing was repeated 40 times, spanning 4 hours from 13:30 to 17:30. Then, the throughput was obtained using the mapping discussed further above.

Figure 8:
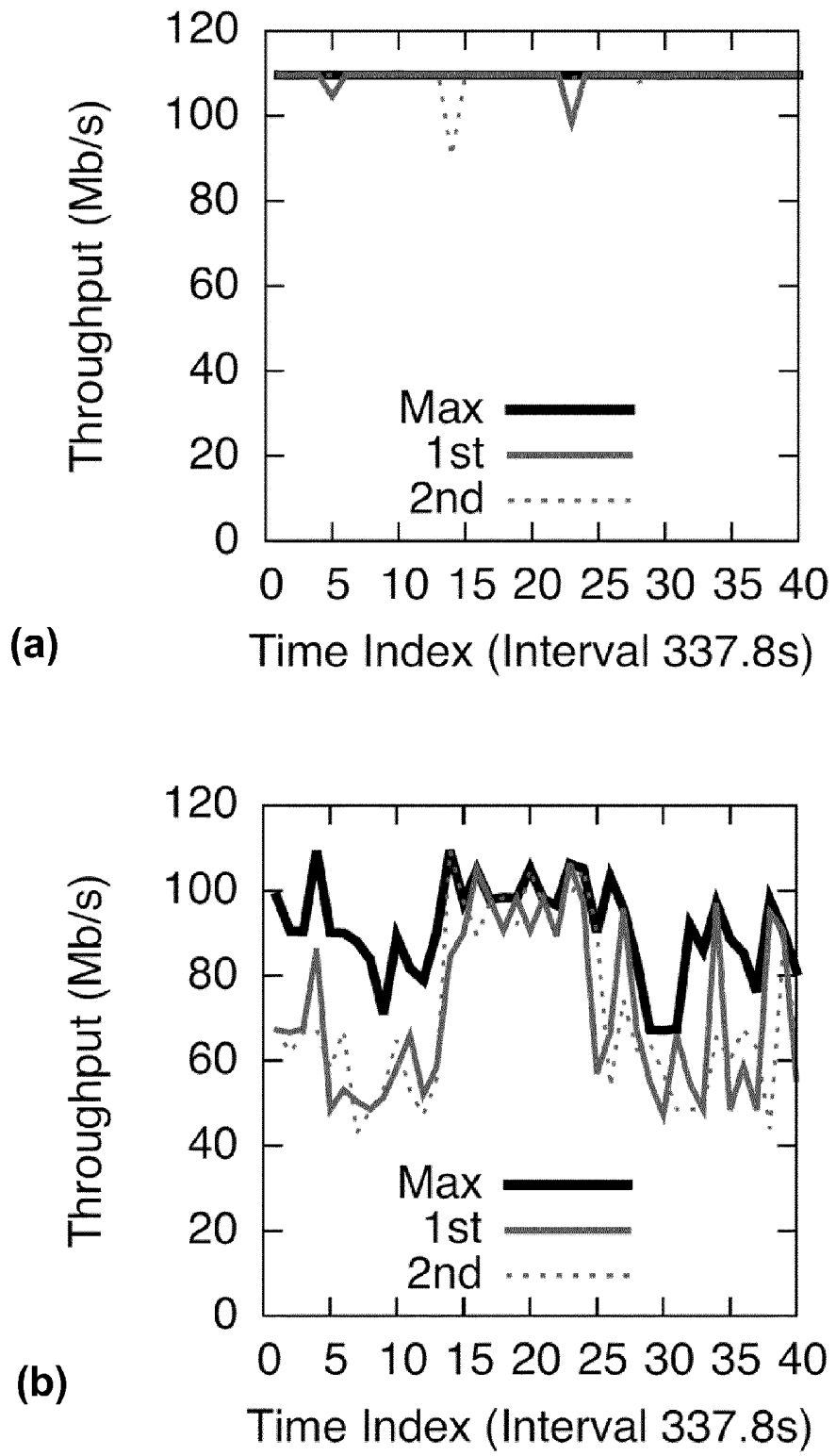
FIG. 8 exemplarily shows throughput variation over time for a 3 Tx antenna pattern set.

The temporal variation of the throughput via sector activation is illustrated in FIG. 8. The maximum (Max) is taken over all patterns for a given time, and the throughput of the patterns that exhibit the first (1st) and second (2nd) largest numbers of the maximum throughput over time are tracked over time. The bold line is the variation of the maximum throughput among those from all patterns of 3 Tx sector activation, labeled "Max". By counting the number of times that a pattern gives the maximum throughput, two patterns, labeled "1st" and "2nd" that most frequently achieve the maximum were chosen and tracked over time. The two sub-figures demonstrate two extreme trends. In FIG. 8(a), 1st and 2nd match the maximum throughput 38 out of 40 times, i.e. most of the time. In FIG. 8(b), however, there is a gap in most of the time between the maximum throughput and the throughput of 1st and 2nd ranked activation patterns. Two patterns cover only 40% of the maximum throughput. Even in this case, during the time interval between time index from 16 to 24, which corresponds to roughly 45 minutes, the 1st or 2nd patterns achieve close to maximum throughput.

To further see how many patterns achieve maximum throughput over time, it was recorded how many times a pattern achieves maximum throughput. Then, the smallest subset of patterns that together cover the maximum throughput for 90% and 95% of time is identified, which is summarized in Table 2.

TABLE 2

Smallest number of sector patterns that include the pattern with the largest throughput for 90% or 95% of the time.

| | Transmitter Side | | | | Receiver Side | | | |
|---|---|---|---|---|---|---|---|---|
| | 1 Sector | | 3 Sectors | | 1 Sector | | 3 Sectors | |
| | 90% | 95% | 90% | 95% | 90% | 95% | 90% | 95% |
| Link 2-1 | 6 | 8 | 9 | 10 | 4 | 6 | 8 | 9 |
| Link 2-3 | 5 | 6 | 2 | 2 | 5 | 6 | 9 | 10 |
| Link 2-5 | 3 | 4 | 3 | 4 | 3 | 5 | 8 | 10 |

On average, 5.4 and 6.3 patterns out of 16 need to be considered to achieve the maximum throughput for over 90% and 95% of the time, respectively. Two observations were made: First, the two extreme cases in FIG. 8, show that only a few patterns are worth being considered to achieve maximum throughput. Second, from FIG. 8(a), the throughput may vary while a few patterns are still providing maximum throughput. It is inferred that the stability of the patterns which provide maximum throughput must be due to the stationary nature of elements of the surroundings in indoor environments. On the contrary, the relatively rapid variation of throughput in a small time scale shown in FIG. 8(b) should be due to people moving around.

In the following section interference reduction and spatial reuse are investigated. Using a similar experimental methodology of sequential link activations as before, SNR and RSS are measured for each pattern in the Tx activation sets, immediately followed by omni-mode measurements. The difference $RSS_{diff} = RSS_x - RSS_{omni}$ is used as interference metric. A negative value means that sector activation pattern x reduces interference compared to omni-mode and increases spatial reuse. All measurements are performed at night, in order to have a stable and stationary environment, and the results are the average of five iterations. The above experiment is performed for both, absence and existence of antenna directivity gain.

Figure 9:
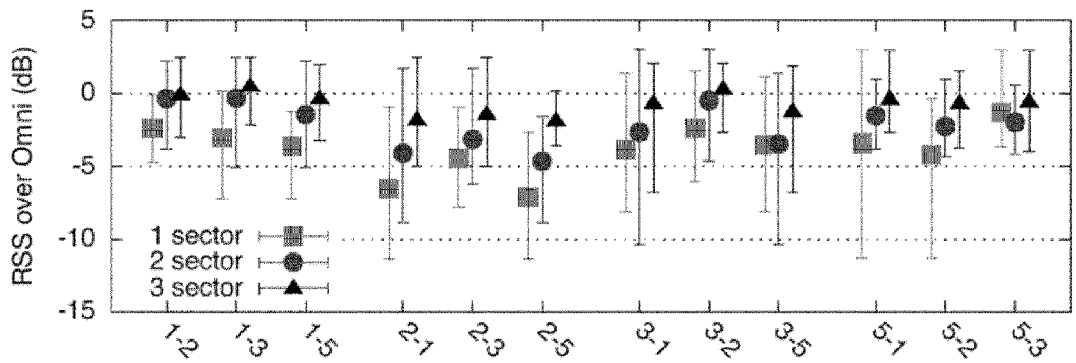
FIG. 9 exemplarily illustrates average $RSS_{diff}$ values for various antenna patterns.
Figure 9:
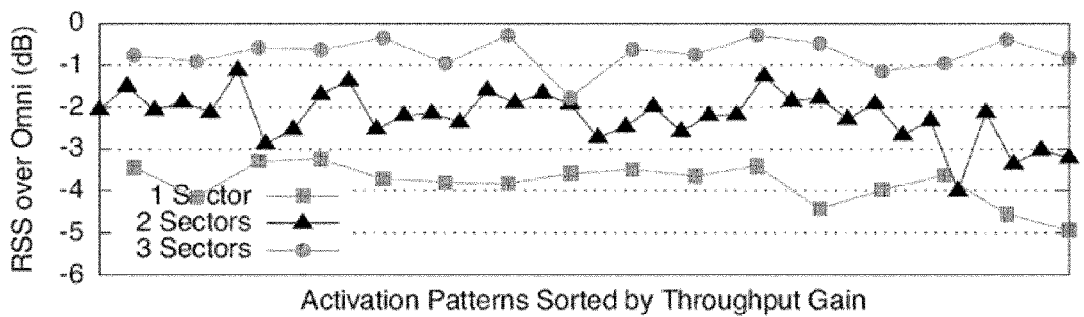

FIG. 9(a) depicts the average $RSS_{diff}$ over omni-mode at the neighborhood of each link, without antenna directivity gain. For example, for the "link 1-2, 1 Sector" point, the average includes the $RSS_{diff}$ values of all links 1-3 and 1-4 obtained for all 1 Sector activations of link 1-2. The $RSS_{diff}$ values decrease as the number of active sectors decreases. With 1 Tx sector per sectorized antenna, the interference over omni-mode can be reduced up to 12 dB at maximum (link 2-1) and 8 dB on average (link 2-5). Although sector activations reduce interference level, they may not necessarily increase throughput gain.

FIG. 9(b) depicts $RSS_{diff}$ values across all antenna patterns in descending order of throughput gains. For each link the patterns are first sorted in accordance with descending throughput gains and then the $RSS_{diff}$ values with the same ranking are averaged. It can be observed that, for each number of activated sectors, the $RSS_{diff}$ values are not related to the throughput gains. Especially for the highest throughput gains they remain constant. Thus, by selecting a number of activated sectors, it is possible to maximize throughput gain subject to a constant interference level, which is minimum when 1 Tx Sector activation patterns are considered. In summary, the interference level without antenna directivity gain is proportional to the number of activated sectors and has little correlation with the maximum throughput gain.

Figure 10:
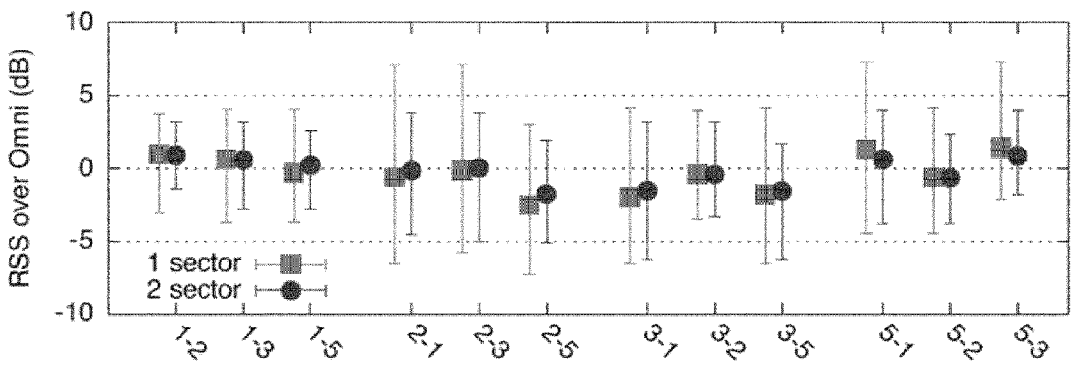
FIG. 10 exemplarily depicts average $RSS_{diff}$ with antenna directivity gain.

FIG. 10 depicts the average $RSS_{diff}$ over omni-mode at the neighborhood of each link when antenna directivity is present. In contrast to the case of no antenna directivity gain, see the discussion of FIG. 9(a), across all links and Tx sector activation sets, the average $RSS_{diff}$ is at most 3 dB, and within 7 dB range of the omni-mode. The average 3 dB interference reduction may be too low to disable 802.11n carrier sensing and thereby increase spatial reuse. Also, the interference reduction does not depend on the number of activated sectors. Although two sector activation has 2.3 dB less antenna directivity gain than single sector activation, see Table 1, its angular coverage is twice of that of a single activated sector. In addition, the use of multiple antennas in MIMO systems provides more opportunities for a receiver to capture more signal paths and thus receive stronger signals than a single antenna receiver. Thus, when antenna directivity is present, the interference reduction is small and does not depend on the number of active sectors.

Based on the findings above, two implementations may be considered: (1) multi-sector antennas without directivity gain for MIMO to utilize throughput gain and spatial reuse and (2) multi-sector antennas with directivity gain for MIMO to increase throughput gain. Implementation (1) can exploit spatial reuse in addition to throughput gain to enhance network-wide performance. However, spatial reuse comes at the expense of hidden terminals which require coordination mechanisms among different links. Moreover, as has been discussed further above, it is still not clear how to find the pattern with large or positive throughput gain if SNR information is not available from the actual hardware.

Implementation (2) comes with modest spatial reuse, but provides higher throughput gains and simpler protocol design. It does not require coordination among different links for sector activation. Moreover, even RSS can be used to find a good activation pattern, providing backward compatibility with IEEE 802.11n.

Figure 14:
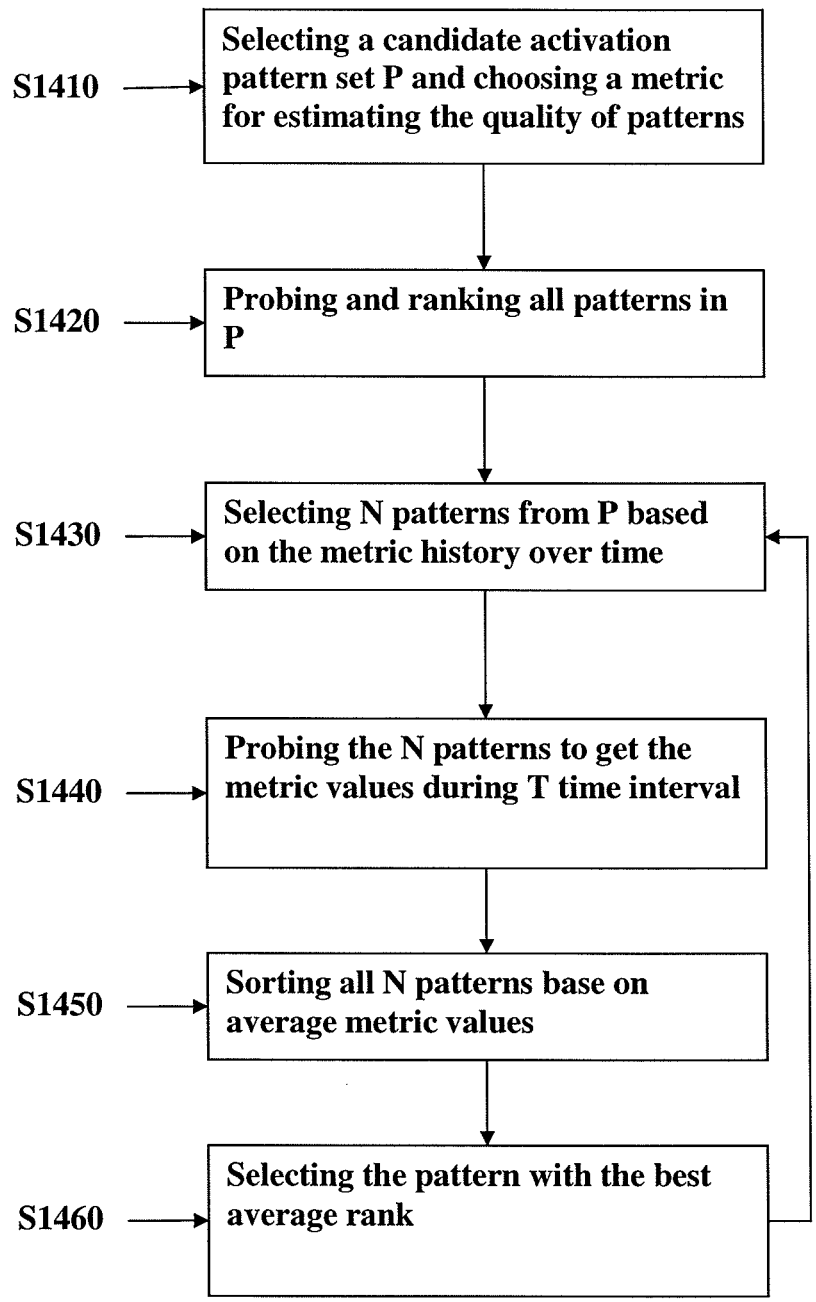
FIG. 14 exemplarily shows a flow diagram for selecting antenna segments for transmission and reception in a MIMO wireless transmission system in accordance with invention principles.

In the following section a method of automatically selecting and activating sectors in accordance with the invention will be presented as shown in FIG. 14. The inventive method is based on implementation (2) presented in the preceding paragraph. In essence, the inventive method includes the following steps:

First, at S1410, prior to normal or regular operation, a candidate activation pattern set, denoted P, is selected. A metric for estimating the quality of patterns is also chosen. Candidate metrics are e.g., explicit feedback-based metrics such as SNR and RSS, and non-explicit feedback-based metrics such as packet error rate (PER) that is measured by ordinary packet transmissions.

Then, at S1420, all patterns in P are probed and ranked.

Once the initial settings are performed, during normal operation, the following steps are executed:

At S1430, N patterns from P are selected based on the metric history over time.

At S1440, the N patterns are probed to get the metric values during T time interval.

At S1450, once all N patterns are probed, all patterns are sorted based on their average metric values.

At step S1460, the pattern with the best average rank is selected and return to S1430.

The initial step enables to start from a good initial state and shortens the time to converge to a good subset. The steps performed during normal operation aim to find the subset of P that will include the maximum throughput patterns as many times as possible. They evaluate and select a subset within a short time, and progressively refine the subset in terms of throughput. This is done, for example, by taking the metric average, e.g., SNR, RSS or PER of the values collected so far. However, rather than using the immediate measurement results, the metric values averaged over time are used, but the subset is eventually selected based on the time averaged ranks. In this way, the inventive method weighs the order of the patterns under investigation, not emphasizing actual values of the metrics. The probing is limited to the sectors of selected subset N. Finally, the best pattern is selected. While the ranks are determined by measuring the link performance averaged over time, the selection is done in accordance with the averaged ranks.

In accordance with the invention three parameters, P, T, and N need to be determined. P could be any subset of the entire pattern set. For example, P could be a set of patterns from Tx activation with a single active sector, which are total 16. However, it is not limited to this kind of pattern. It is to be noted that, the larger the set is, the more challenging it is to find a good subset for probing. At the same time, more throughput gain can be expected. Once a large candidate set is determined, the time averaged rank will be leveraged to reduce the set size, reducing the number of probes. The choice of T is dependent upon how frequently the pattern with the highest throughput in P changes. Moreover, it also depends on how accurately the channel variation is tracked over time. As discussed further above, the pattern with the highest throughput changes in a small time scale, following channel characteristics in typical indoor environments. Thus, to most accurately track the channel variation, T should be significantly shorter than the coherence time, which is typically around 1 second. On the other hand, one may choose a few or tens of seconds of T, willing to accept less accurate tracking, but reducing the probing overheads over time.

For a chosen T and N, the amount of additional probing overheads should be considered when N is determined. Since the overhead amount is very specific to a physical or MAC protocol used it depends on the actual implementation. For example, the probing operation may be integrated into the actual protocol as an additional packet exchange operation or as being piggybacked on existing ordinary packet transfer schedules. After that, N may be chosen such that the throughput gain outweighs the throughput loss due to the probing overheads.

Figure 11:
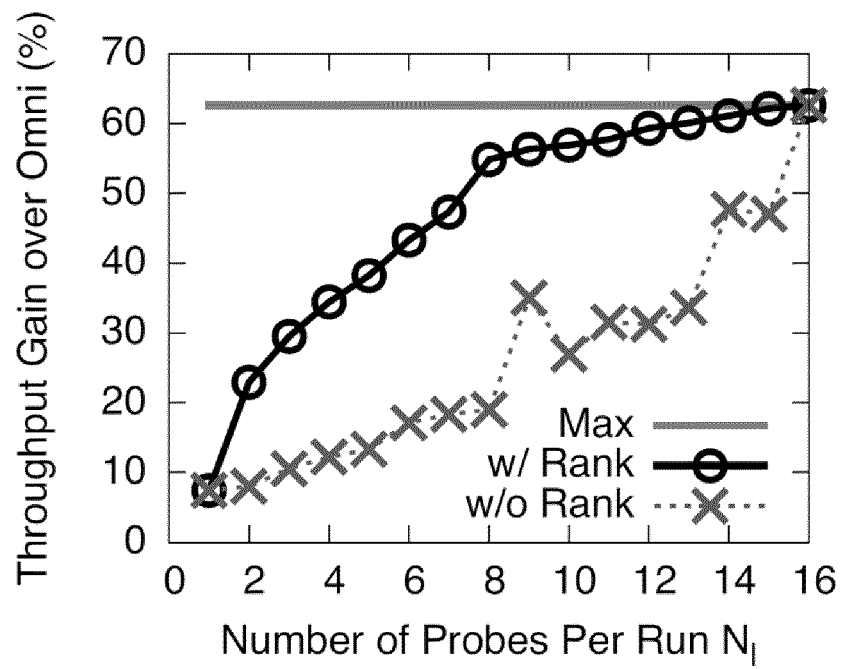
Figure 11:
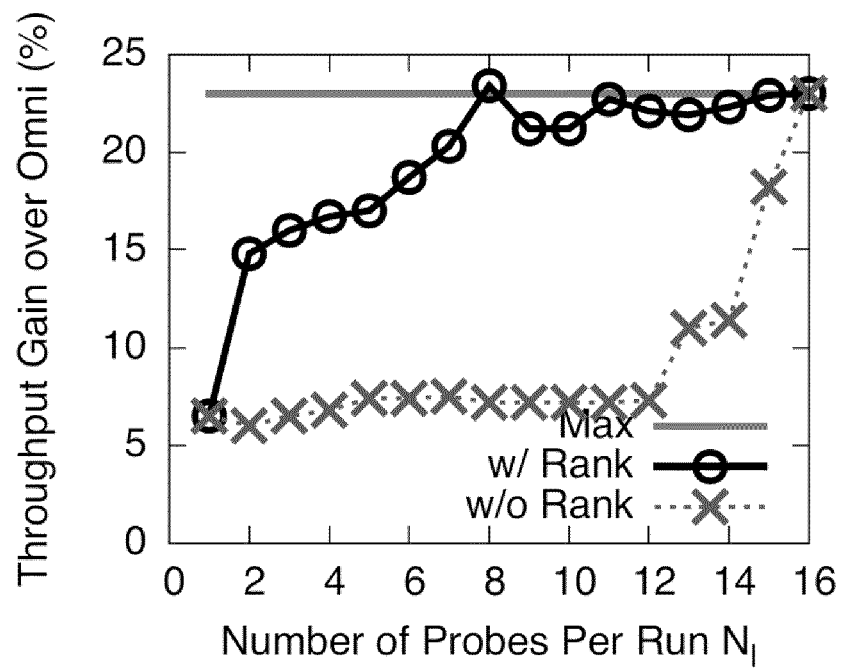

The patterns for Tx sector activation are referred to as P. For evaluation the SNR and RSS for all P are collected, and ranking is performed on the collected data set for fair comparison. To collect this data set, the same SNR measurement is performed for both a certain pattern and omni-mode in a back-to-back manner. The measurement is repeated for a sufficiently number of times, e.g. 40 times, and are repeated for various times of the day, and days of the week. Measurements are repeated for all links. FIG. 11 exemplarily shows the throughput gains for different numbers of link antenna pattern to select from.

Figure 12:
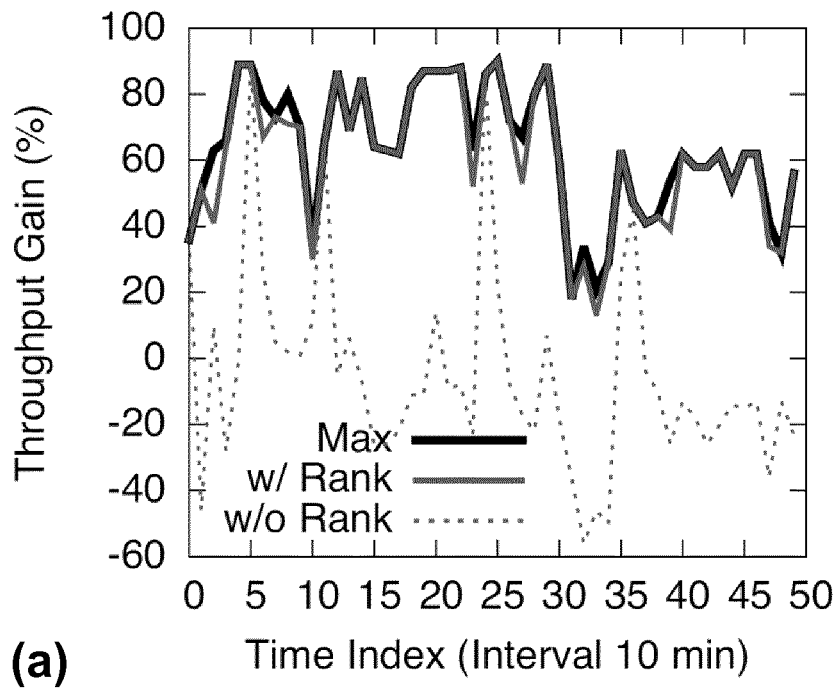
FIG. 12 exemplarily shows throughput gains over time with and without using ranking in accordance with invention principles.
Figure 12:
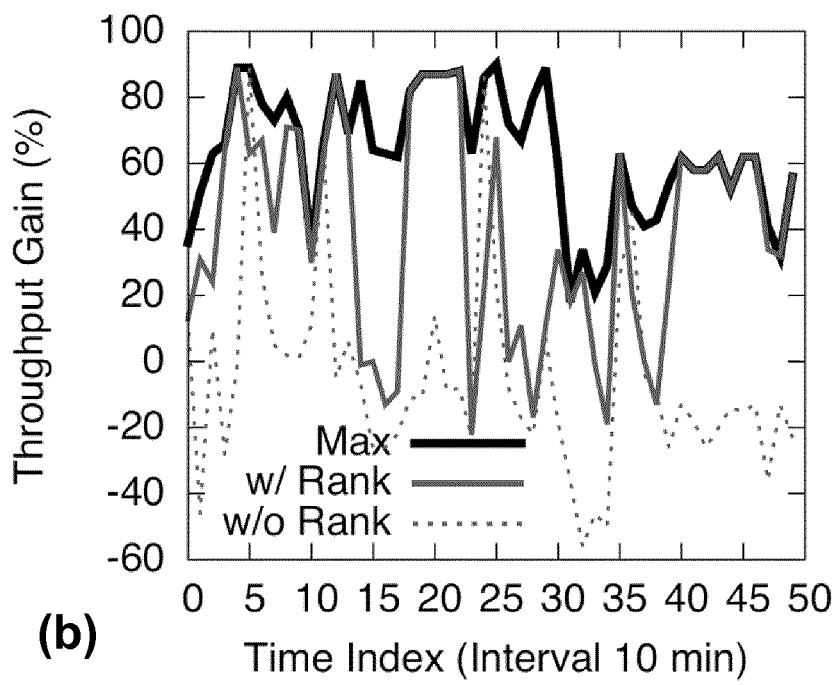

FIG. 12 shows throughput gains averaged over all links and over time for N=8. Two metrics are considered: SNR and RSS in FIG. 12(a) and FIG. 12(b), respectively. In the figures, "Max" is the throughput gain when the pattern with the largest metric value is selected for each time. "w/Rank" corresponds to using the ranks of patterns for the subset selection, and "w/o Rank" corresponds to simply using the time average of SNR or RSS values. It is apparent from both FIGS. 12(a) and 12(b), that the inventive method successfully selects the activation patterns that give positive throughput gains. Especially rank-based selection with SNR provides more than 50% gains while the maximum is 62% even when the number patterns under consideration is reduced to half. When the inventive method selects in accordance with RSS, the maximum gain is 23%, which is much smaller than selection in accordance with SNR. Thus, the use of SNR is advantageous. Although both variants approach to the maximum as N increases, the steepness of rank-based selection is much sharper than that of the time average-based. This again shows that, in a long run, the channel changes frequently, but the few patterns keep succeeding in achieving the close-to-the maximum throughput gain.

FIG. 12 reveals how well the inventive method tracks the pattern with the highest throughput over time when N=8 at the specific link 2-3. With SNR, rank-based selection successfully finds the patterns with the highest throughput almost all time. Time average-based selection, however, performs relatively poor even with SNR. Since 8 out of 16 patterns are probed for SNR, the poor performance shows that the raw time average based selection is influenced more by small time scale variation of channels, less by the long term stationarity of a good subset of patterns.

The present invention uses the finding that throughput gain can be had using a limited subset of antenna activation patterns. The subset is determined by collecting the SNRs for all activating patterns for Rx and Tx, determining the stability of SNR over a certain time, and rank the pattern in accordance with their long-term stability. Only those pattern are considered in case the throughput falls below a threshold value, which were found to have a long-term SNR lying above a predetermined threshold value. The determination of SNR may be periodically repeated in order to compensate for changes in the environment. The invention advantageously avoids the need for brute-force testing of all possible antenna pattern in combination with excessive packet information tracking for finding an appropriate antenna pattern in case of a drop in throughput.

The invention claimed is:

1. Method of selecting antenna segments for transmission and/or reception in a MIMO wireless transmission system using sectorized directional antennas, including:
    selecting, from an initial set of ranked link antenna patterns, a link antenna pattern having a best average rank, the link antenna patterns corresponding to different selections of activated antenna segments and being ranked in accordance with their average link performance;
    at predetermined time intervals, successively selecting a subset of link antenna patterns having average ranks within a predetermined distance to the best average rank;
    determining an average link performance of the link antenna patterns selected during the predetermined time intervals;
    determining an average rank of the link antenna patterns according to the determined average link performance;
    selecting antenna segments for transmission and/or reception corresponding to the link antenna pattern having the best average rank; and
    repeating the process at the next predetermined time interval.

2. The method of claim 1, wherein the average ranks of the link performance patterns not selected to be part of the subset remains the same.

3. The method of claim 1, wherein the time period over which the link antenna pattern ranks are averaged is a moving window time period, or wherein the average rank is determined as exponential average.

4. The method of claim 1, wherein different subsets of link antenna patterns are provided for a certain time of day or day of a week.

5. The method of claim 1, wherein a link is established between a transmitter and a receiver, and wherein the transmitter or the receiver informs the respective receiver or transmitter which link antenna pattern to select.

6. The method of claim 1, further including
    selecting a new link antenna pattern not part of the subset of link antenna patterns, and performing link performance measurement and ranking; and
    replacing a link antenna pattern in the subset of link antenna patterns having a lower rank than the new link antenna pattern.

7. The method of claim 1, wherein the predetermined time intervals are dynamically adapted depending on a time of day and/or day of a week.

8. Apparatus comprising a microprocessor, program memory, data memory and a wireless transmitter and/or receiver having at least two antennas and adapted to operate in a MIMO fashion, wherein the at least two antennas are sectional directional antennas, and the program memory holds program instructions adapted to
    select, from an initial set of ranked link antenna patterns, a link antenna pattern having a best average rank, the link antenna patterns corresponding to different selections of activated antenna segments and being ranked in accordance with their average link performance;
    at predetermined time intervals, successively select a subset of link antenna patterns having average ranks within a predetermined distance to the best average rank;
    determine an average link performance of the link antenna patterns selected during the predetermined time intervals;
    determine an average rank of the link antenna patterns according to the determined average link performance;
    select antenna segments for transmission and/or reception corresponding to the link antenna pattern having the best average rank; and
    repeat the process at the next predetermined time interval.

9. The apparatus of claim 8, wherein the average ranks of the link performance patterns not selected to be part of the subset remains the same.

10. The apparatus of claim 8, wherein the time period over which the link antenna pattern ranks are averaged is a moving window time period, or wherein the average rank is determined as exponential average.

11. The apparatus of claim 8, wherein different subsets of link antenna patterns are provided for a certain time of day or day of a week.

12. The apparatus of claim 8, wherein the program instructions are further adapted to establish a link between a transmitter and a receiver, and wherein the transmitter or the receiver informs the respective receiver or transmitter which link antenna pattern to select.

13. The apparatus of claim 8, wherein the program instructions further
    select a new link antenna pattern not part of the subset of link antenna patterns, and perform link performance measurement and ranking; and
    replace a link antenna pattern in the subset of link antenna patterns having a lower rank than the new link antenna pattern.

14. The apparatus of claim 8, wherein the time intervals are dynamically adapted depending on a time of day and/or day of a week.

15. A computer-readable medium adapted for non-transitory storage of program information, wherein the computer-readable medium stores program information which, when executed by a device having a microprocessor, a program, a data memory, a wireless transmitter and/or receiver and at least two sectional directional antennas, enable the device to
    select, from an initial set of ranked link antenna patterns, a link antenna pattern having a best average rank, the link antenna patterns corresponding to different selections of activated antenna segments and being ranked in accordance with their average link performance;
    at predetermined time intervals, successively select a subset of link antenna patterns having average ranks within a predetermined distance to the best average rank;
    determine an average link performance of the link antenna patterns selected during the predetermined time intervals;
    determine an average rank of the link antenna patterns according to the determined average link performance;
    select antenna segments for transmission and/or reception corresponding to the link antenna pattern having the best average rank; and
    repeat the process at the next predetermined time interval.

16. The computer-readable medium of claim 15, wherein the time intervals are dynamically adapted depending on a time of day and/or day of a week.

* * * * *